Nov. 10, 1970  L. C. LYNNWORTH  3,538,750

HIGH TEMPERATURE ULTRASONIC MEASURING SYSTEM

Filed April 26, 1968  4 Sheets-Sheet 1

INVENTOR
LAWRENCE C. LYNNWORTH
BY
Kenway, Jenney & Hildreth
ATTORNEYS

| SECTION | AREA = $\frac{\pi D^2}{4}$ | POLAR MOMENT OF INERTIA J | NORMALIZED TORSIONAL WAVE IMPEDANCE |
|---|---|---|---|
| a) circle, diameter D | $\frac{\pi D^2}{4}$ | $\frac{\pi D^4}{32} = 0.098 D^4$ | 1.00 |
| b) square, side d | $d^2$ ($d \approx 0.9D$) | $\frac{d^4}{6} = 0.103 D^4$ | 1.05 |
| c) rectangle, 2d × d/2 | $d^2$ | $\frac{17 d^4}{48} = .218 D^4$ | 2.23 |
| d) rectangle, 4d × d/4 | $d^2$ | $\frac{257 d^4}{192} = .825 D^4$ | 8.42 |
| e) tube, OD X, ID 0.5X | $\frac{3\pi X^2}{16}$ ($X = 2D/\sqrt{3} \approx 1.15D$) | $\frac{15 \pi X^4}{512} \approx 0.164 D^4$ | 1.67 |
| f) tube, OD y, ID 0.6y | $0.16 \pi y^2$ ($y = 1.25D$) | $0.0855 y^4 \approx 0.208 D^4$ | 2.12 |
| g) tube, OD z, ID 0.8z | $0.09 \pi z^2$ ($z = 1.67D$) | $0.0578 z^4 \approx 0.447 D^4$ | 4.55 |

FIG. 2

United States Patent Office 3,538,750
Patented Nov. 10, 1970

3,538,750
HIGH TEMPERATURE ULTRASONIC
MEASURING SYSTEM
Lawrence C. Lynnworth, Waltham, Mass., assignor to
Panametrics, Inc., Waltham, Mass., a corporation of
Massachusetts
Filed Apr. 26, 1968, Ser. No. 724,450
Int. Cl. H04r 25/00, 27/00
U.S. Cl. 73—67.7
19 Claims

ABSTRACT OF THE DISCLOSURE

A system for measuring the ultrasonic transmission characteristics of a specimen as a function of temperature. The specimen is electrically heated and pulses of ultrasonic energy are coupled to it, while it is so heated. Means for determining the average temperature are also provided. The cross section of the specimen must be small enough to have no thermal gradient transverse to the specimen upon Joule heating and the ultrasonic energy must have a wave length long compared to the cross sectional dimensions required for transmission of the ultrasonic pulses.

FIELD OF THE INVENTION

This invention relates in general to ultrasonic materials testing and more particularly to a system for measuring the ultrasonic transmission characteristics of materials at high temperatures.

BACKGROUND OF THE INVENTION

There are a number of situations in which it is desirable to measure basic characteristics of electrically conductive materials at elevated temperatures. Characteristics of interest include Young's modulus, Shear modulus, Poisson's ratio, hysteresis effects at phase changes, nitriding, diffusion, grain reorientations and crystal growth. These characteristics at elevated temperatures are of interest for several materials including metals, composites and other materials which may be semi-conductive or conductive at elevated temperatures even though they are considered electrical insulators at room temperature. Where the specimen to be measured is of very small diameter, such as a few thousandths of an inch and the characteristics are to be measured at temperatures such as 3000 degrees K., a number of problems arise when using conventional measurement techniques. Thus, the specimen wire must be heated within an inert atmosphere or vacuum in order to prevent oxidization and burn-out of the wire, and placing elements in close juxtaposition or contact with the wire at the elevated temperatures both distorts the temperature and may also affect the characteristic to be measured.

SUMMARY OF THE INVENTION

In the measuring system of the present invention ultrasonic waves are transmitted through the specimen member and the ultrasonic transmission between two or more selected points on the specimen is used to provide information as to the characteristics to be measured. At the same time the specimen member is electrically heated to achieve, by Joule heating, the appropriate temperature. The measurement of the transmission velocity of shear (torsional) and extensional waves within the material provides a measurement of a number of critical characteristics of the material. Young's modulus, E, of a material having a density $\rho$ may be expressed as $$E = V_o^2 \rho$$

where $V_o$ is the extensional wave velocity.

Similarly the Shear modulus, G, of a material of density $\rho$ may be expressed as $$G = V_T^2 \rho$$

where $V_T$ is the torsional wave velocity.

Poisson's ratio, $\sigma$, is expressed as:

$$\sigma = \frac{E}{2G} - 1 = \frac{V_o^2}{2V_T^2} - 1.$$

These ultrasonic transmission characteristics are measured for a specimen member, which typically would be a wire or other shape which is thin compared to wavelength, and which is sufficiently thin also so that there will be no significant thermal gradient across the thickness dimension of the wire. The average temperature of the specimen is determined by means such as an optical pyrometer or by measuring the electrical resistivity of the heated wire. The ultrasonic characteristics may be determined either by measuring the time delay or amplitude degradation of ultrasonic pulses transmitted along the wire or by producing on the specimen two or more ultrasonic discontinuities, such as kinks, which will generate reflections in response to an ultrasonic pulse transmitted along the specimen. In one embodiment the first discontinuity may be the interface between the lead-in member and the specimen where these are not acoustically matched. The time between reflections from the two points for the same ultrasonic wave is measured as indicative of the velocity of the pulse between these two points. Similarly, measuring the amplitude of the echoes generated at the two points permits one to calculate attenuation.

The measuring apparatus includes a lead-in member between the generator of ultrasonic waves and the specimen member. The ultrasonic pulse generator is usually a transducer which generates pulses of ultrasonic energy, and in pulse-echo operation also generates electrical signals in response to receive ultrasonic waves. In through transmission testing a second transducer is acoustically coupled to the other end of the specimen. This transducer converts received pulses of ultrasonic energy into electrical pulses. The sensor portion of the system then includes a transducer and circuitry. The circuitry constituting the remainder of the sensor element provides as an output these electrical signals whether derived from a single transducer, serving both as transmitter and receiver or from a separate receiver transducer. The lead-in member is used to couple the ultrasonic waves to the specimen and, in the pulse-echo mode, to couple the reflected ultrasonic wave back to the transducer. The lead-in member is typically butt welded to the specimen member and is often characterized by an acoustical impedance which is comparable to that of the specimen member when reflections at this joint must be minimized.

In order to provide for the elevated temperature, electrical current must also be coupled to the specimen wire. This may be done directly or through this lead-in member and a second lead-out wire. The connection between the source of electrical current and the specimen or the lead-in, lead-out wires usually is one which minimizes the acoustical reflections. One way this can be done is by using a contact medium of acoustical impedance which is much less than that of the lead-in member. It has also been found that electrical contacts which are thin compared to the principle wavelengths, typically a few inches, are quite satisfactory, in that they produce only very small reflections. Electrically, any elements between the input generator and specimen should have a much lower electrical resistance per unit length than the specimen so that the generation of a specific current will result chiefly in heating of the specimen.

In addition to the above characteristics the lead-in and lead-out members must, of course, be chemically and metallurgically compatible with the specimen material, mechanically strong enough to support the test configurations and thermally capable of withstanding the temperatures which may be generated at the joints between the lead-in, lead-out and specimen wires.

DESCRIPTION OF THE DRAWING

In the drawing:

FIG. 2 is a cross sectional view of a variety of specimen configurations, together with their mechanical wave impedance characteristics;

DESCRIPTION OF PREFERRED EMBODIMENTS

Figure 1:
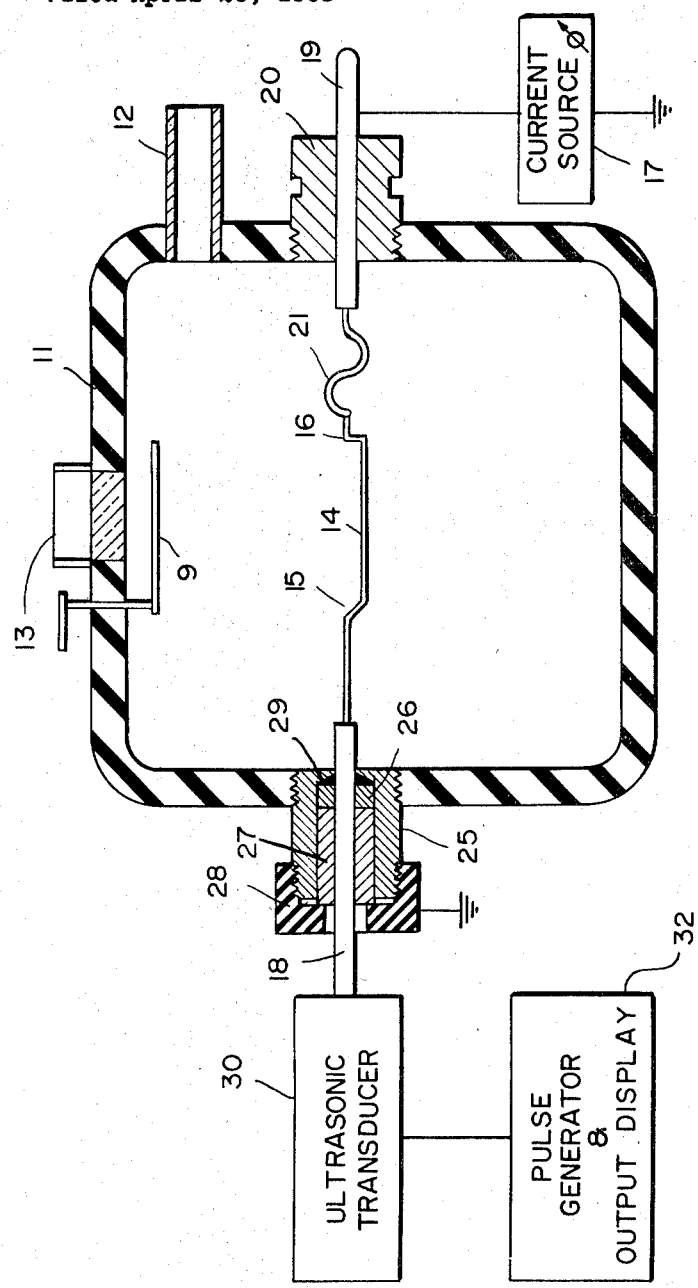
FIG. 1 is an illustration in a generally cross sectional view of a pulse-echo measurement system and construction in the present invention.

With reference now to FIG. 1, a pulse-echo system for measuring the ultrasonic transmission characteristics of a specimen wire 14 at elevated temperatures is shown. The specimen wire 14 is mounted within a test chamber 11 which includes a port 12 so that the tests may be carried on either in a vacuum or at a selected atmosphere, for example, an inert gas. Another port 13 is provided for viewing. In order to determine the temperature of the heat wire 14 an optical pyrometer (not shown) may be used at this port; alternatively, the temperature may be determined by measuring the resistivity of the wire. A shutter 9 is provided with port 13 to shut off this port. The specimen member 14 is typically but welded to a lead-in element 18 and a lead-out element 19. The lead-out element 19 is supported in the test chamber 11 on an electrically insulating connector 20. When the specimen 14 is in the vertical direction, a portion 21 of the lead-out 19 may be coiled, e.g., copper braiding, to allow the specimen to expand and contract easily during the thermal cycling without subjecting the wire or the joints to undue stresses. A current source 17 is connected between the lead-out member 19 and ground.

The lead-in member 18 is supported in chamber 11 by means of a special feed through connector 25, which supports the lead-in 18 while also providing an electrically conductive, acoustically reflectionless path between the lead-in 18 and ground. The connector 25 has an axial opening which contains an electrically conducting contact medium having an acoustical impedance very different from that of specimen 14 and lead-in 18. Typically, this material 26 may be lampblack which is sealed in place with a sealant 29 at the inner end and a follower 27 which is forced against the material 26 by means of a threaded cap 28. Alternative means of achieving the reflectionless electrical contact are discussed below. The lead-in 18 is acoustically coupled to an ultrasonic transducer 30. The ultrasonic transducer may take the form of a piezoelectric crystal or a magnetostrictive element which in turn is driven by a pulse from a pulse generator and an output display element 32. This pulse generator and output display element 32 produces electrical pulses to actuate the ultrasonic transducer and also converts the received electrical pulses from the ultrasonic transducer into an output indication of the transmission along the specimen.

While the generator and display element 32 is illustrated as a single unit to both generate the ultrasonic pulses and convert received ultrasonic pulses to electrical signals, these functions may also be performed by two separate elements. The elements may both be coupled to the lead-in element or one may be coupled to the lead-in element 18 and one to the lead-out element 19.

The support feedthrough 25 may also be made identical to feedthrough 20, in which case the electrical contact for both the ground and high contacts may be made with point or line contacts, which are reflectionless, said contacts being at locations within or outside the chamber.

The specimen element 14 has kinks 15 and 16 located appropriate distances from either end and these generate acoustical reflections which serve in the pulse generator and output display 32 as timing indicators, the spacing between the reflection pulses indicating the transmission time of the ultrasonic wave between the two kinks 15 and 16. Measuring the amplitude of these echoes permits one to compute attenuation. The first kink 15 would typically be at ∼45°, and the second kink 16∼90°, to yield echoes of comparable amplitudes in the absence of attenuation.

Figure 1A:
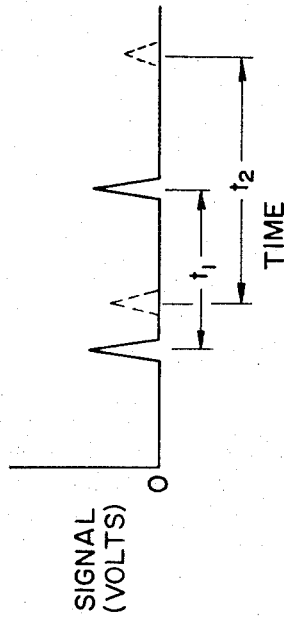
FIG. 1a is a graphical illustration of the time distribution of signals produced in the measurement system of this invention.

In FIG. 1a, there are illustrated the electrical signals produced by the transducer 30 in response to the received ultrasonic reflections. The waveforms shown in solid lines are those produced at room temperature, whereas those in dotted lines are the waveforms produced at an elevated temperature, such as 3000° K.

The transit time $t_1$ between the reflection pulses at room temperature indicates the round trip elapsed time for the ultrasonic wave to pass from the kink 15 to the kink 16 and back, and this time is directly related to the velocity of the ultrasonic wave over that distance. Similarly, the time $t_2$ between the dotted line pulses is the transit time for the ultrasonic wave to pass from kink 15 to kink 16 and back at the elevated temperature and indicates the transmission velocity at that temperature.

The current source 17 may be any conventional AC or DC current source suitable for heating the specimen member 14. This current source typically has a power output of approximately 1 kilowatt and is usually arranged to be variable for relatively rapid control of the temperature. An important advantage of the present invention is that very high temperatures can be easily controlled, because of the modest power requirements, facilitating accurate ultrasonic measurements.

For a pulse echo device, such as that illustrated in FIG. 1 to operate properly, several requirements must be met with respect to the control of the acoustical and electrical impedances of the elements at the intersections both between the electrical contact from the current generator to the lead-in member 18 and between the lead-in member 18 and the specimen member 14. In order to obtain unambiguous results from the acoustical measurement, there ideally should be no unwanted echoes generated at these interfaces. In practice, it is extremely difficult to achieve a perfectly acoustically reflectionless electrical contact. Thus, in practice, the impedances at these interfaces could be arranged so that the timing, polarity or magnitude of the unwanted echoes is such that their occurrence can be either tolerated or compensated for.

At the interface between the lead-in member 18 and the specimen member 14 the acoustic impedances should be closely matched in order to maximize the ultrasonic energy transmitted into the specimen member. Failure to achieve this matching will result both in a lower amount of energy within the specimen member and hence a poorer signal to noise ratio, and in unwanted reflections generated at the joint between the lead-in member 18 and the specimen 14. These unwanted reflections complicate the identification of the wanted reflections resulting from the discontinuities at 15 and 16.

The fraction of the acoustical energy transmitted through a joint between the two thin members 18 and 14 may be expressed as $$T = \frac{4Z_1 Z_2}{(Z_1 + Z_2)^2}$$

where $Z_1$ is the acoustical impedance of one member and $Z_2$ is the acoustical impedance of the second member.

In order to concentrated the Joule heating in the specimen member 14, the electrical resistance per unit length of the specimen member should be significantly higher than that of the lead-in and lead-out members 18 and 19 respectively. Usually, this requires a larger diameter wire for the lead-out and lead-in members than for the specimen member itself. Since the acoustical impedance varies with the product of density and cross sectional area, one method of matching the acoustical impedance is to form the lead-in and lead-out members of a lower density material than that of the specimen member. In a specific example, a .03″ diameter Re specimen is welded to a 0.4″ diameter Mo lead-in and the lead-in is in turn welded to a .06″ Remendur (Ni alloy) magnetostrictive wire which serves as the ultrasonic wave generator. The specimen is welded at its other end to a .04″ diameter Mo lead-out wire.

A second approach to achieving the required mismatch of electrical impedances and match of acoustical impedances, particularly torsional wave impedance, is to vary the cross sectional shape. For example, the torsional wave impedance of a round wire element varies according to the fourth power of its radius, while electrical impedance varies as the square of the radius. Thus the impedace $Z_T$ for torsional waves is expressed at $$Z_T = V_T \rho J = V_T \rho \pi r^4 / 2$$

for round wire where $\rho$ = density of material
$V_T$ = shear wave velocity
$J$ = polar moment of inertia, and
$r$ = radius of wire, whereas the electrical resistance per unit length $R/l$ is expressed as, $$R/l = 1/Ac = 1\pi r^2 c$$

for a round wire where $c$ = electrical conductivity, and
$A$ = area, $\pi r^2$.

If the cross sectional area $A$ is kept constant, then the electrical resistance per unit length remains constant. For a constant value of cross sectional area, however, varying the cross sectional configuration will vary the torsional wave impedance. In FIG. 2, there are illustrated a variety of cross sectional configurations having a constant area $\pi D^2/4$.

Tabulated beside the cross sectional configurations (a) through (g) are the polar moments of inertia $J$ and the normalized torsional wave impedance. From this FIG. 2, it can be seen that a configuration such as FIG. 2(d) of FIG. 2(f) can produce a significant variation in torsional wave impedance for the same cross sectional area of a given material. Thus, if the specimen material is formed with a cross sectional shape such as that shown in FIG. 2(d) or 2(f), a round wire lead-in, even of the same material, having a much larger cross sectional area may be used, while maintaining a matched torsional wave impedance. This increased cross sectional area of the lead-in will, of course, result in a decreased electrical resistance of the lead-in and hence concentrate the Joule heating in the specimen.

This same technique of changing the cross sectional shape or area may also be used in place of the kinks 15 and 16 to generate the discontinuities in the specimen member itself.

In FIG. 1 the electrical connection to the lead-in member 18 is rendered reflectionless through the use of a contact material, lampblack, which has an acoustic impedance substantially different from that of the lead-in member 18. The same technique may be employed using a material which is electrically conductive and fluid at the temperature of interest, for example, $CuSO_4$, Hg, In, etc.

Figure 3:
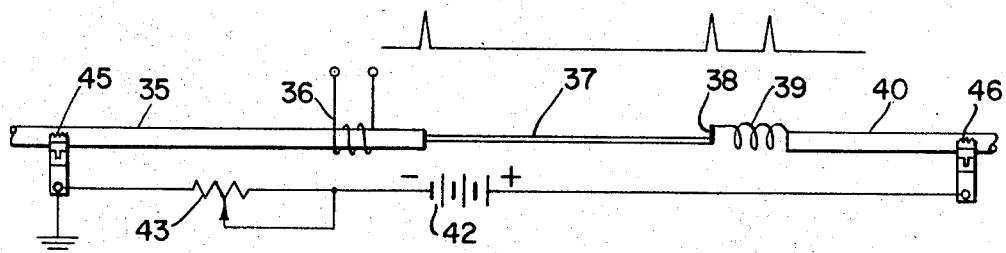
FIG. 3 is an illustration in generally schematic form of a second embodiment of the measurement system constructed in accordance with the principles of this invention.

In the embodiment illustrated in FIG. 3, the current source, which consists of the battery 42 and the current control potentiometer 43 in series, is connected by clips 45 and 46, to lead-in member 35 and lead-out member 40, respectively. The specimen 37 is connected directly to the lead-in member 35 at one end and through a flexible coil 39 to the lead-out member 40 at the other end. As illustrated in the accompanying wave form a first marker pulse occurs at the intersection between the lead-in 35 and the specimen 37 and the second wanted pulse occurs at the discontinuity 38 of the specimen 37. In the arrangement illustrated the electrical contact 45 is spaced in significant acoustic distance away on the lead-in member 35 from the transducer 36. Thus, even though an echo is produced from the reflection at that contact 45, it occurs only after the initial two marker pulses which define the time being measured have occurred. That unwanted pulse is the third one shown in the wave form and can be isolated if it occurs at a time later than the pulses being measured. One limitation in the use of this technique is that the self-heating current must pass through the transducer region and hence the situation must be such that the materials and temperatures required do not overheat the transducers or seals.

Figure 4:
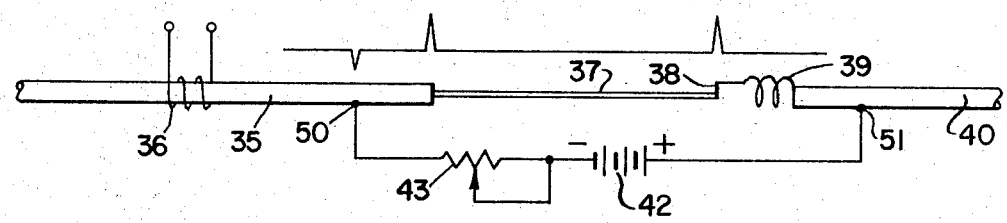
FIG. 4 is an illustration in schematic form of a third embodiment of the measurement system constructed in accordance with the principles of this invention.

In FIG. 4 an embodiment is illustrated in which the electrical contacts at 50 and 51 to the lead-in, lead-out members 35 and 40, respectively, are arranged so that echoes produced at these contacts are of opposite polarity to those used for the acoustic measurement. In the embodiment shown herein the electrical contacts are made through a small solder connection to the lead-in members and these electrical contacts constitute an increase in acoustic impedance, whereas the discontinuity producing the first wanted pulse and the kink 38 producing the second wanted pulse both constitute a decrease in impedance. Since the amplitude reflection coefficient is $$R = \frac{Z_2 - Z_1}{Z_2 + Z_1}$$

the waveform obtained is then that as shown in conjunction with FIG. 4 where the unwanted echo is of opposite polarity from the echoes used for the measurement itself.

Figure 5:
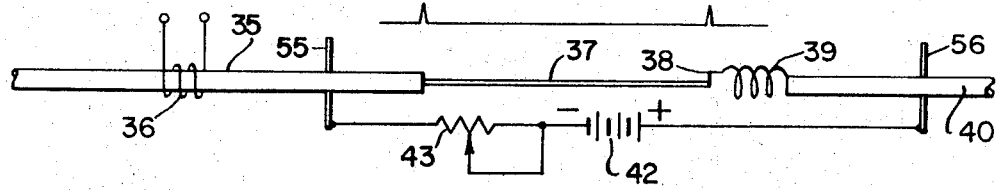
FIG. 5 is an illustration in schematic form of a fourth embodiment of the measurement system constructed in accordance with the principles of this invention.
Figure 5A:
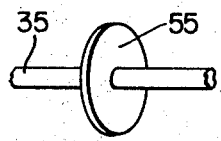
FIG. 5a is an illustration of an enlarged view of a portion of the system of FIG. 5.
Figure 6:
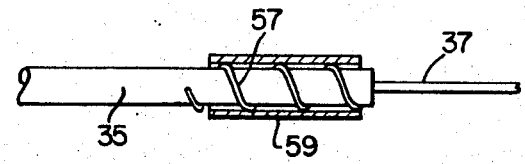
FIG. 6 is an illustration of an electrical connection suitable for use in the practice of this invention.

A third approach to the problem of minimizing the reflections at electrical contact points is shown in FIGS. 5 and 6. In the embodiments illustrated in these figures the magnitude of echoes from the electrical contact is reduced by employing a contact member which has a dimension in the direction of transmission of the ultrasonic wave which is much smaller than the wavelength of the transmitted ultrasonic wave. Typically, a dimension 1/100 that of the wavelength introduces virtually no reflection. In FIG. 5 and FIG. 5a, the electrical contact is shown as a washer element 55 which contacts lead-in member 35 and lead-out member 40.

In the configuration shown in FIG. 6 a spiral wire 57 is wound around the lead-in member 35 and a conducting metal sleeve 59 is placed over the spiral wire and in electrical contact with it. The diameter of the wire used as a spacer should typically be small, for example, one-tenth of that of the lead-in member 35, so that the area ratios are 1 to 100. Equivalently, wire mesh may be used, or a spiraled coil of fine gage wire may be used instead of the single spiral wire 57 illustrated. The use of the acoustic isolators shown in FIGS. 5 and 6 allows good electrical contact while minimizing acoustic reflections.

While the embodiments shown in FIGS. 3, 4 and 5 utilize an acoustic discontinuity at the interface between the lead-in member and the specimen to provide one marker for pulse echo measurement, these embodiments could also be constructed with a matched acoustic impedance at this interface with a kink or other discontinuity within the specimen serving as the source of the initial echo pulse.

In order to obtain a precise measurement of the ultrasonic transmission characteristics as a function of temperature, the effects of the longitudinal temperature gradient between the two discontinuities should either be eliminated or averaged out. One method of eliminating the gradient is to produce a flat temperature profile between the two points 15 and 16. This may be done by the use of auxiliary heaters or a shield of heat reflectors, or, as in FIG. 1, by arranging for points 15 and 16 to be sufficiently remote from the relatively cool lead-in and lead-out wires 18 and 19.

Another method for eliminating the ambiguity due to the temperature gradient is to provide a symmetrical specimen with four or more equally spaced acoustical discontinuities and measure the differential time between pairs of pulses to determine the velocity of the ultrasonic wave over each of these distances. In this way, one can vary the total specimen length until proportions are found where the temperature gradient due to the boundary effects at the end of the wire will be substantially eliminated.

In some instances, it may be less complicated to allow a longitudinal temperature gradient to exist in the specimen rather than to attempt to eliminate this gradient. The sound velocity measured in a specimen element containing longitudinal temperature gradients is the harmonic mean velocity $V_H$ defined by $$V_H = \frac{l}{\int_0^1 \frac{dx}{V(T)}} = \frac{l}{\int_0^1 \frac{dx}{V[T(x)]}}$$

where
$l$ = the distance between acoustic discontinuities, and
$T$ = the temperature, and
$V$ = the velocity of sound in the medium.

The average specimen temperature $T_{avg}$ is defined by $$T_{avg} = \frac{1}{l} \int_0^1 T(x) \, dx$$

A temperature referred to as the sonic temperature, $T_s$ is that temperature at which the sound velocity, $V$, equals $V_H$. Generally $T_s \neq T_{avg}$. However, the difference between these quantities is typically less than 1% for refractory metals such as rhenium, despite variations in temperature which may be linearly or parabolically distributed over the specimen length $l$, with temperature differences as high as 1,000° C.

For those materials where the electrical resistivity is proportional to the temperature $T$, the electrical resistance measured between the two acoustic discontinuities, in the case of the pulse echo mode, has the value $$R_{avg} = (PT_{avg} + Q) \frac{l}{CA_o}$$

if
$C_o$ = conductivity at a reference $T$, where
$A$ = the cross sectional area of the specimen and $P$ and $Q$ are constants. Thus the measurement of $R_{avg}$ is a good measure of the average temperature over the specimen for materials of this type.

Figure 7:
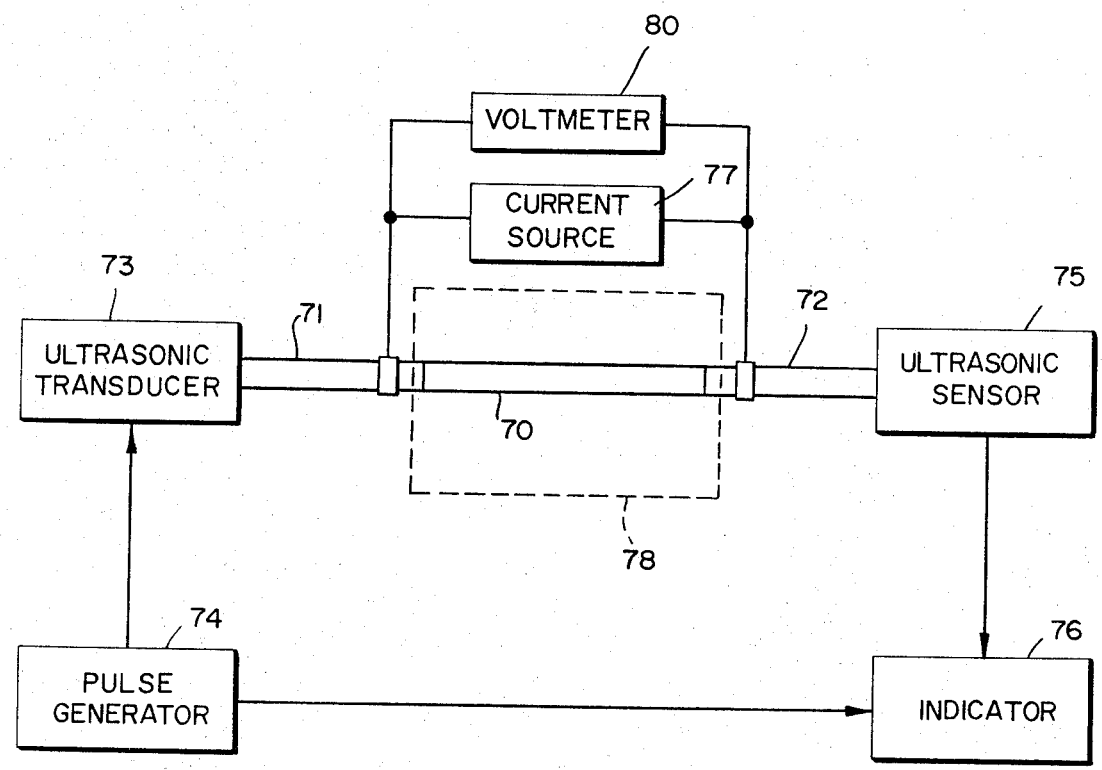
FIG. 7 is a generally diagramatic illustration of another embodiment of the invention.

The embodiments discussed with reference to FIGS. 1 through 6 all operate in the pulse echo mode; however, the measuring system of the invention may also be embodied in a system for through transmission measurement. In FIG. 7, there is illustrated a through transmission configuration. The specimen element 70 has a lead-in member 71 attached to one end of it and a lead-out member 72 to the other. The ultrasonic transducer 73 is coupled directly to the lead-in member 71 and a sensor 75 for providing output electrical signals in response to received ultrasonic pulses is acoustically coupled to the lead-out member 72. A pulse generator 74 energizes the transducer 73 and provides a timing pulse to indicator 76. The output from the sensor 75 is also fed to indicator 76 and this indicator can provide an output indication of the change of amplitude and the time delay between initiation of the ultrasonic pulse at the transducer 73 and receipt of the transmitted pulse at sensor 75. The specimen element and at least a portion of the lead-in and lead-out elements would normally be enclosed in a chamber, similar to that of FIG. 1, indicated schematically at 78.

The specimen 70 is electrically heated by means of current supplied from current generator 77. The electrical contacts between current generator 77 and the specimen 70, may either be directly to the specimen 70, or as shown, to the lead-in and lead-out elements 71 and 72. In those cases where the electrical contact is made directly to the specimen member 70, the contact should normally be reflectionless, taking the electrical contact form illustrated in FIGS. 4, 5 or 6. The resistivity of the specimen may be measured by measuring the voltage drop between the two electrical contacts, typically, as shown, with a volt meter 80. Even in those instances where the electrical contact is made to the lead-in and lead-out members, as in the drawing, these members would normally have a relatively low resistance compared to specimen element 70 and hence the resistivity measurement between the two electrical contact points would be substantially a measure of the resistance of the specimen element. In those cases where the accuracy must be greater than that involved in such an approximation, the contact must be made directly between the two points on the specimen element between which the acoustic transmission characteristics are being measured.

Electrical conductivity is, of course, necessary to effect the Joule heating of the specimen. There are, however, a number of dielectric materials which are nonconductive at room temperature and yet are quite electrically conductive at higher temperatures. In the case of these materials, the temperature may be elevated by nonelectrical heating means, for example, radiation, until the material becomes sufficiently conductive and then the Joule heating may be used to perform the actual tests at the maximum temperatures of interest. Alternatively, a very thin cladding or vapor-deposited metal may coat the dielectric material, to facilitate Joule heating, and yet not interfere with the ultrasonic measurement, when the coating area is very thin compared to the substrate area. Of course, some materials are normally fabricated and used in composite form, such as boron coated tungsten, or metal clad nuclear fuel elements, and these are readily self heated and tested according to the principles of this invention.

While the invention has been illustrated in its simpler forms, with the specimen generally in the same direction as the lead-in and lead-out, the sensor itself may be coiled, or oriented at an angle to the lead-in, or juxtaposed in position other than those illustrated.

Having described the invention various modifications and improvements will now occur to those skilled in the art and the invention described should be construed as limited only by the spirit and scope of the appended claims.

What is claimed is:

1. A system for measuring the ultrasonic transmission characteristics of an elongated specimen element at elevated temperatures, wherein said specimen element has a cross sectional area sufficiently small so that there is no substantial thermal gradient across said cross section upon Joule heating of said specimen, comprising:
- a lead-in member acoustically coupled to said specimen element;
- an electric current generator;
- means coupling said electric current generator to said specimen to pass electrical current through said specimen, said coupling means being characterized by a lower electrical resistance per unit length than said specimen element, such that said specimen element is preferentially heated by said electrical current;
- an ultrasonic transducer coupled to said lead-in member for transmitting pulses of ultrasonic energy into said specimen, said pulses of ultrasonic energy being characterized by a wave-length which is long compared to the cross sectional dimension of said specimen;
- sensor means coupled to said specimen element, said sensor means producing output electrical signals in response to received ultrasonic pulses;
- indicator means connected to said sensor means for providing an output indication of the transmission characteristics of said specimen element for pulses of ultrasonic energy produced by said transducer and received by said sensor; and
- means for measuring and producing an output indication of the average temperature of said specimen element.

2. A system in accordance with claim 1 wherein said lead-in member is acoustically coupled to one end of said specimen element and said sensor is coupled to the other end of said specimen element, the acoustic impedance of said lead-in member and said specimen element being substantially matched.

3. A measuring system in accordance with claim 2 wherein said electric generator coupling means is coupled to said lead-in member and wherein the cross sectional area of said lead-in member is substantially larger than the cross sectional area of said specimen element, and wherein the cross sectional configuration of said specimen element differs from the cross sectional configuration of said lead-in member such that said specimen has a substantially different polar moment of inertia.

4. A measuring system in accordance with claim 3 wherein the product of the polar moment of inertia, the density and the torsional wave velocity of said specimen is substantially equal to the torsional wave impedance of said lead-in member.

5. A system in accordance with claim 2 wherein said means coupling the electric current generator makes a substantially acoustically reflectionless contact to said lead-in member and said specimen element.

6. A system in accordance with claim 5 wherein said electrical contact means has a dimension in the direction of transmission of said ultrasonic waves which is small relative to the wave length of said ultrasonic waves.

7. A system in accordance with claim 1 and further including first and second acoustic discontinuities formed in said specimen element, including means for measuring the ultrasonic reflections generated at said first and second acoustic discontinuities as an indication of the transmission of said pulses of ultrasonic energy within said specimen element.

8. A measurement system in accordance with claim 7 wherein said means coupling the electric current generator to said specimen includes said lead in member and a lead out member, said first and second discontinuities being formed within said specimen element at points sufficiently spaced from said lead in member and said lead out member so that the length of said specimen element between said discontinuities is relatively unaffected by the thermal cooling effect of said coupling means.

9. A measuring system in accordance with claim 7 wherein said means coupling said electric current generator to said specimen element directly contacts said specimen element at two points, said contacts constituting said first and second acoustic discontinuities.

10. A measuring system in accordance with claim 1 wherein said lead-in member is formed of an electrically conductive material having a density substantially lower than said specimen and wherein said electric currene generator is coupled by said coupling means to said lead-in member.

11. A measuring system in accordance with claim 10 wherein the coupling material between said electric current generator and said lead-in member is lampblack.

12. A measuring system in accordance with claim 1 wherein the acoustic impedance of said lead-in member differs substantially from the acoustic impedance of said specimen element, the transmission coefficient resulting from said impedances being sufficient to transmit a significant portion of the ultrasonic energy in said ultrasonic pulse from said lead-in member into said specimen element.

13. A measuring system in accordance with claim 7 wherein the interface between said lead-in member and said specimen element is one of said acoustic discontinuities.

14. A measuring system in accordance with claim 12 wherein the means coupling said electric current generator to said specimen electrically contacts said lead-in member at a point displaced away from said transducer in a direction opposite to said specimen element at an acoustic distance greater than the separation between said transducer and said specimen.

15. A measuring system in accordance with claim 13 wherein the relative acoustic impedance between said current generator coupling means and said lead-in member is such that reflections generated at the juncture between said coupling means and said lead-in member are of opposite polarity to the reflections generated at said specimen discontinuities.

16. A measuring system in accordance with claim 1 wherein said means for coupling said electric current generator comprises a spiral isolator of area small relative to the cross sectional area of said lead-in member and a concentric sleeve surrounding said isolator in electrical contact therewith, said electrical contact means coupling said electric current generator to said specimen element through said lead-in member.

17. A measuring system in accordance with claim 1 wherein said specimen is enclosed in a chamber, said chamber being evacuated during said measurements.

18. A measuring system in accordance with claim 1 wherein said specimen is enclosed in a chamber, the chamber being filled with a fluid during said measurement.

19. A measuring system in accordance with claim 18 wherein said fluid is an inert gas.

References Cited

UNITED STATES PATENTS

| | | | |
|---|---|---|---|
| 3,320,797 | 5/1967 | Tajiri et al. | 73—71.5 |
| 3,433,051 | 3/1969 | Parker | 73—67.2 |
| 3,350,942 | 9/1966 | Peltola | 73—67.8 |
| 3,273,146 | 11/1967 | Hurwitz | 73—67.8 |

FOREIGN PATENTS 694,139   9/1965   Italy.

OTHER REFERENCES

R. Goldman, Ultrasonic Technology, 1962 by Reinhold Corp., pp. 222–223.

RICHARD C. QUEISSER, Primary Examiner

V. J. TOTH, Assistant Examiner

U.S. Cl. X.R.

73—67.1